United States Patent
Jetter et al.

(10) Patent No.: US 11,434,926 B2
(45) Date of Patent: Sep. 6, 2022

(54) HAND-GUIDED WORKING APPARATUS HAVING A RADIAL FAN

(71) Applicant: Andreas Stihl AG & Co. KG, Waiblingen (DE)

(72) Inventors: Simon Jetter, Pluederhausen (DE); Sebastian Lechner, Waiblingen (DE); Marc Schmid, Oppenweiler (DE); Jan Geffers, Waiblingen-Neustadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 17 days.

(21) Appl. No.: 17/082,724

(22) Filed: Oct. 28, 2020

(65) Prior Publication Data
US 2021/0123457 A1 Apr. 29, 2021

(30) Foreign Application Priority Data
Oct. 29, 2019 (EP) .................................. 19205812

(51) Int. Cl.
*F04D 29/44* (2006.01)
*F04D 29/42* (2006.01)
*F04D 29/66* (2006.01)

(52) U.S. Cl.
CPC ....... *F04D 29/441* (2013.01); *F04D 29/4226* (2013.01); *F04D 29/663* (2013.01)

(58) Field of Classification Search
CPC .. F04D 29/441; F04D 29/4226; F04D 29/663; F04D 29/42; F04D 29/40;
(Continued)

(56) References Cited

U.S. PATENT DOCUMENTS 1,529,815 A * 3/1925 Siemen ..................... F04D 1/04
  415/56.1
2,001,522 A * 5/1935 Chester ................. F04D 29/462
  415/148
(Continued)

FOREIGN PATENT DOCUMENTS

DE     102 45 418 A1    6/2004
DE  10 2005 003 275 A1    7/2006
(Continued)

*Primary Examiner* — Aaron R Eastman
(74) *Attorney, Agent, or Firm* — Crowell & Moring LLP

(57) ABSTRACT

A hand-guided working apparatus has a radial fan. The radial fan includes a fan impeller and an air duct, which has a spiral portion surrounding the fan impeller and has a duct cross section, which increases in the air flow direction. An outlet funnel portion adjoins the spiral portion, widens in a funnel shape in the air flow direction and has a radially inner boundary wall and a radially outer boundary wall. The outlet funnel portion ends in an air outlet opening, the outlet width of which is smaller than an outside diameter of the fan impeller. The radially inner and/or the radially outer boundary wall of the outlet funnel portion has a curvature opposed to that of the spiral portion. An intermediate wall is arranged in the outlet funnel portion, between the radially inner and the radially outer boundary wall. The intermediate wall extends with a curvature opposed to that of the spiral portion and divides the outlet funnel portion into two component portions, each widening in the shape of a funnel in the air flow direction.

20 Claims, 4 Drawing Sheets

(58) Field of Classification Search
CPC . F04D 1/04; F04D 17/00; F04D 17/06; F04D 17/08
See application file for complete search history.

(56) References Cited

U.S. PATENT DOCUMENTS

| | | | | |
|---|---|---|---|---|
| 4,232,994 | A * | 11/1980 | Tsuji | F04D 29/626 |
| | | | | 415/127 |
| 4,944,654 | A * | 7/1990 | Chou | F24F 13/08 |
| | | | | 415/211.2 |
| 5,144,757 | A * | 9/1992 | Sasso | A45D 20/16 |
| | | | | 34/96 |
| 6,575,695 | B1 * | 6/2003 | Miyamoto | A47L 5/22 |
| | | | | 415/119 |
| 6,868,821 | B2 | 3/2005 | Maier et al. | |
| 7,774,896 | B2 | 8/2010 | Andresen et al. | |
| 10,502,225 | B2 | 12/2019 | Knopp et al. | |
| 2004/0165984 | A1 * | 8/2004 | Ochiai | F04D 29/422 |
| | | | | 415/206 |
| 2008/0298959 | A1 * | 12/2008 | Della Mora | F04D 29/422 |
| | | | | 415/203 |
| 2011/0200426 | A1 * | 8/2011 | Takano | F04D 29/4226 |
| | | | | 415/119 |
| 2012/0141264 | A1 * | 6/2012 | Cui | F04D 29/282 |
| | | | | 415/206 |
| 2017/0016453 | A1 * | 1/2017 | Knopp | F04D 29/422 |
| 2021/0148377 | A1 * | 5/2021 | Hayashi | F25D 17/067 |
| 2021/0388847 | A1 * | 12/2021 | Hayashi | F04D 29/441 |

FOREIGN PATENT DOCUMENTS

| | | | |
|---|---|---|---|
| GB | 2524315 | A | 9/2015 |
| WO | WO 90/09524 | A1 | 8/1990 |

\* cited by examiner

HAND-GUIDED WORKING APPARATUS HAVING A RADIAL FAN

CROSS REFERENCE TO RELATED APPLICATION

This application claims priority under 35 U.S.C. § 119 from European Patent Application No. 19205812.1, filed Oct. 29, 2019, the entire disclosure of which is herein expressly incorporated by reference.

BACKGROUND AND SUMMARY OF THE INVENTION

The invention relates to a hand-guided working apparatus comprising a radial fan. Working apparatuses of this kind are in use, for example, as hand-guided, motor-driven garden or forestry working apparatuses, such as hedge cutters, hedging shears, brush cutters, pole pruners, leaf blowers, sweepers, power saws, lawnmowers and scarifiers, wherein an internal combustion engine or a battery-powered electric motor is used as a motor drive.

The radial fan is used, for example, to feed cooling air to an internal combustion engine or an electric motor or to supply suction air or blowing air for suction or blowing devices. Thus, German Laid-Open Application DE 102 45 418 A1 discloses a special radial fan for cooling an internal combustion engine, and German Laid-Open Application DE 10 2005 003 275 A1 discloses a special radial fan for a suction/blowing device that can be carried on one's back.

In the case of working apparatuses of this kind, noise generation is often an important factor. Specifically in the case of apparatuses which have a battery-operated electric motor as a drive motor for a working apparatus, said electric motor being relatively quiet in comparison with an internal combustion engine, the noise generated by the fan can contribute noticeably to the overall noise emissions of the apparatus.

The technical problem addressed by the invention is that of providing a hand-guided working apparatus of the type stated at the outset which allows operation with relatively low noise emissions, especially in respect of its radial fan, in comparison with conventional apparatuses of this kind.

The invention solves this problem by providing a hand-guided working apparatus having specific features as follows.

In the working apparatus according to the invention, the radial fan comprises a fan impeller and an air duct, which comprises a spiral portion surrounding the fan impeller and having a duct cross section, which increases in air flow direction, and an outlet funnel portion, which adjoins the spiral portion, widens in a funnel shape in the air flow direction and has a radially inner boundary wall and a radially outer boundary wall, wherein the outlet funnel portion ends in an air outlet opening, the outlet width of which is smaller than an outside diameter of the fan impeller. In this case, the radially inner and/or the radially outer boundary wall of the outlet funnel portion have/has a curvature opposed to that of the spiral portion, and an intermediate wall is arranged in the outlet funnel portion, between the radially inner and the radially outer boundary wall, wherein the intermediate wall extends with a curvature opposed to that of the spiral portion and divides the outlet funnel portion into two component portions, each widening in the shape of a funnel in the air flow direction.

By virtue of this special configuration of the radial fan, the working apparatus causes only relatively low fan-induced noise emissions, in particular lower noise emissions than with conventional radial fans without an intermediate wall or with intermediate wall configurations of a different kind or configurations of a different kind of the spiral portion surrounding the fan impeller and of the outlet funnel portion adjoining the spiral portion, as it has also been possible to verify experimentally. The fan-induced noise emissions minimized in this way advantageously create the preconditions for improving the overall acoustic quality of the apparatus in comparison with the prior art and for imparting a high-quality overall sound to the apparatus during operation.

Contributing to this minimization of the noise of the radial fan, to be more precise of the air flow provided by said fan, are, in particular, the measures comprising arranging the intermediate wall in the outlet funnel portion between the two radial boundary walls thereof, giving the intermediate wall in this arrangement a curvature opposed to that of the spiral portion, and dividing the outlet funnel portion into the two component portions by means of the intermediate wall in such a way that each component portion, for its part, widens in the shape of a funnel in the air flow direction. As a result, there is no reduction in the air flow cross-section in the air flow direction in the region of the outlet funnel portion in which the intermediate wall is arranged, either due to the shape of the two radial boundary walls or due to the shape of the intermediate wall. On the contrary, the air passage cross section increases continuously, preferably steadily, in the air flow direction in each of the two component portions, owing to the funnel-shaped widening thereof.

In a development of the invention, an inner transverse spacing of the intermediate wall from the radially inner boundary wall and an outer transverse spacing of the intermediate wall from the radially outer boundary wall are equal or differ by at most 10%, preferably by at most 5%, i.e. the larger transverse spacing is then at most 10% or 5% larger than the smaller transverse spacing. This defines a substantially longitudinally central arrangement of the intermediate wall between the two radial boundary walls of the outlet funnel portion. It has been found that this substantially longitudinally central position of the intermediate wall in the outlet funnel portion has a particularly favorable influence on the reduction of the air flow noises. In alternative developments, the intermediate wall is arranged in a different way, e.g. with significantly different transverse spacings from the two radial boundary walls.

In a development of the invention, an inner cross-sectional area between the intermediate wall and the radially inner boundary wall and an outer cross-sectional area between the intermediate wall and the radially outer boundary wall are equal or differ by at most 10%, in particular by at most 5%. It has been found that this equal-area division of the cross-sectional area available to the air flow, which is bounded radially by the radially inner and the radially outer boundary wall in the outlet funnel portion, has a particularly favorable influence on the reduction of the air flow noises by virtue of the intermediate wall. In alternative implementations, the intermediate wall is arranged in a different way, forming significantly different cross-sectional areas.

In a development of the invention, the wall thickness of the intermediate wall transversely to the air flow direction is constant, or a maximum wall thickness is at most 10% greater than a minimum wall thickness. This means that the intermediate wall extends with a constant or at most only slightly varying wall thickness in the air flow direction, which avoids corresponding wall-induced flow noises. In alternative developments, the wall thickness of the intermediate wall varies to a greater extent along its length in the air flow direction, e.g. in the form of a wedge-shaped increase in the wall thickness in the air flow direction.

In a development of the invention, the intermediate wall ends flush with the air outlet opening in the air flow direction or ends before the latter at a distance which is at most 10% of the length of said wall in the air flow direction and/or at most twice the wall thickness of said wall. It has been found that this arrangement of the intermediate wall is likewise conducive to a reduction in the flow noises caused by the radial fan. In alternative developments, the intermediate wall ends at a greater distance before the air outlet opening, e.g. at a distance of more than 10% of the intermediate wall length in the air flow direction or of more than twice the intermediate wall thickness.

In a development of the invention, an inflow-side wall side edge of the intermediate wall extends into a transitional region of the spiral portion and of the outlet funnel portion. This measure too proves very advantageous for the minimization of the fan-induced noise emissions. In alternative developments, the intermediate wall does not begin in this transitional region in the air flow direction but begins at a downstream distance from this outlet funnel portion.

In a development of the invention, the radially inner and/or the radially outer boundary wall of the outlet funnel portion continue/continues counter to the air flow direction into the spiral portion and change/changes their/its direction of curvature in a transitional region of the spiral portion and of the outlet funnel portion. This measure too proves very advantageous for the reduction of the fan-induced noise emissions. In a special implementation, the radially outer boundary wall continues into the spiral portion over the entire circumference of the fan impeller and, in the spiral portion of the air duct, forms a radially outer boundary wall thereof, wherein it merges at its upstream end with the radially inner boundary wall of the outlet funnel portion. In alternative implementations, each of the two radial boundary walls of the outlet funnel portion or at least the radially inner boundary wall does not continue into the spiral portion and/or its direction of curvature does not change in the transitional region.

In a development of the invention, the intermediate wall is of continuous, perforation-free design. This means that there is no air flow connection through the intermediate wall between the two component portions into which the outlet funnel portion is divided by the intermediate wall. This too contributes to minimization of the air flow noises of the fan. In alternative developments, the intermediate wall is formed by a perforated wall.

In a development of the invention, at least one of the intermediate wall, the radially inner boundary wall and the radially outer boundary wall has a sound-damping surface and/or is formed from a sound-absorbing material, wherein, in the present case, sound-damping should also be interpreted in a wide sense to include sound-reducing. By virtue of the sound-damping surface or sound-absorbing material, the respective wall, i.e. the intermediate wall and/or the radially inner boundary wall and/or the radially outer boundary wall, are/is capable of acting in corresponding fashion as a sound-damping element and thereby additionally contributing to the minimization of the air flow noises. In alternative developments, the respective wall has a surface which does not have any sound-damping properties, or the wall is formed from a material without sound-absorbing properties.

In a development of the invention, the working apparatus has a working tool, an electric drive motor for the working tool and/or for the radial fan, and a cooling air duct for the drive motor, wherein the radial fan is arranged in the cooling air duct. The use of the electric drive motor results in reduced motor operating noise in comparison with the use of an internal combustion engine and, by virtue of the radial fan, the electric drive motor can be effectively cooled with cooling air while, at the same time, the noise emissions of the radial fan are low. In alternative developments, the working apparatus has an internal combustion engine as a drive motor for the working apparatus and/or for the radial fan.

The invention also comprises an implementation in which the intermediate wall is represented by a plurality of individual walls, which are arranged spaced apart from one another in the outlet funnel portion between the radially inner and the radially outer boundary wall and extend with a curvature opposed to that of the spiral portion and divide the outlet funnel portion into a corresponding number of more than two component portions, each widening in the shape of a funnel in the air flow direction. In this case, the individual intermediate walls are preferably equidistantly spaced, and/or the component portions preferably have cross-sectional areas that are the same size as one another or differ only slightly from one another.

Advantageous implementations are illustrated in the drawings. These and further advantageous implementations of the invention are described in greater detail below.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
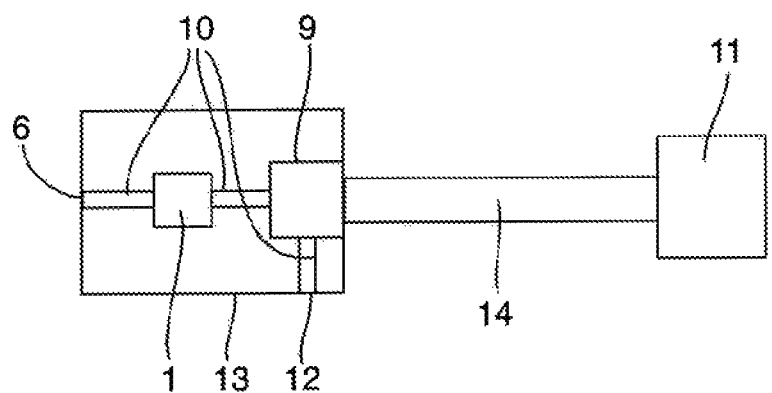
FIG. 1 shows a schematic block diagram of a hand-guided working apparatus having a working tool, a drive motor and a cooling air duct with a radial fan.
Figure 2:
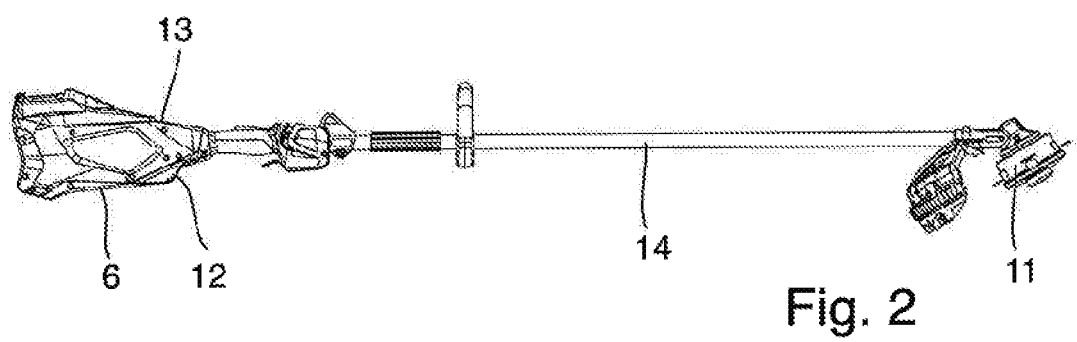
FIG. 2 shows a side view of a working apparatus of the kind shown in FIG. 1, in the form of a grass trimmer.
Figure 3:
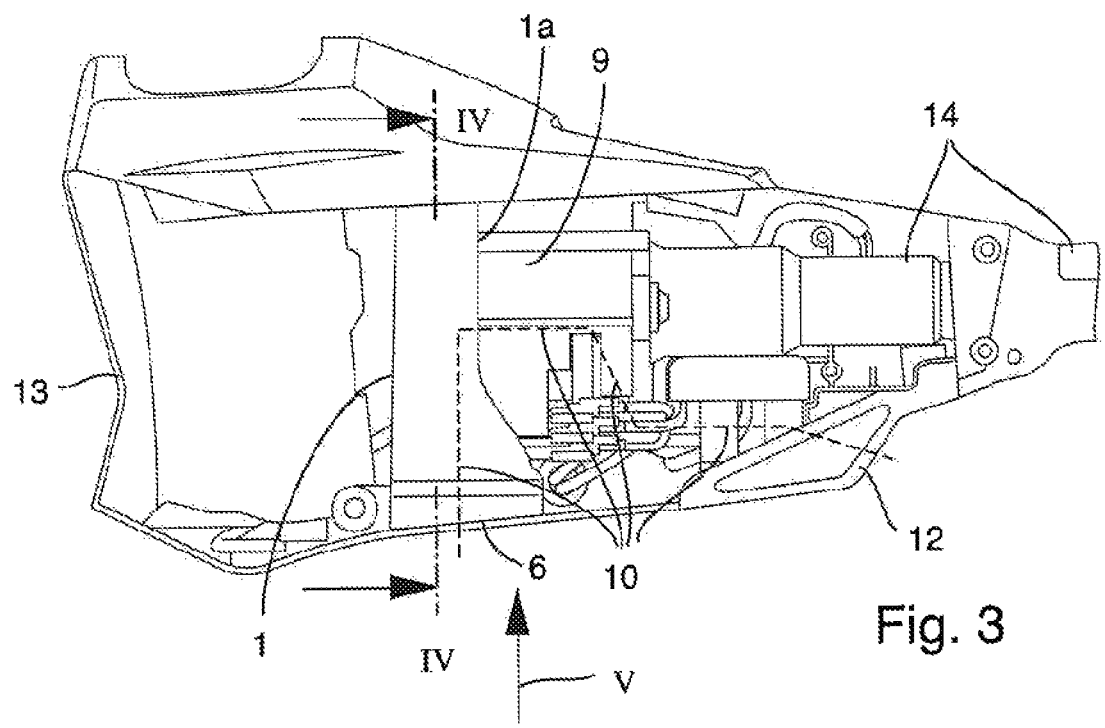
FIG. 3 shows a detail side view of a motor housing part of the apparatus in FIG. 2 with the motor housing half removed.
Figure 4:
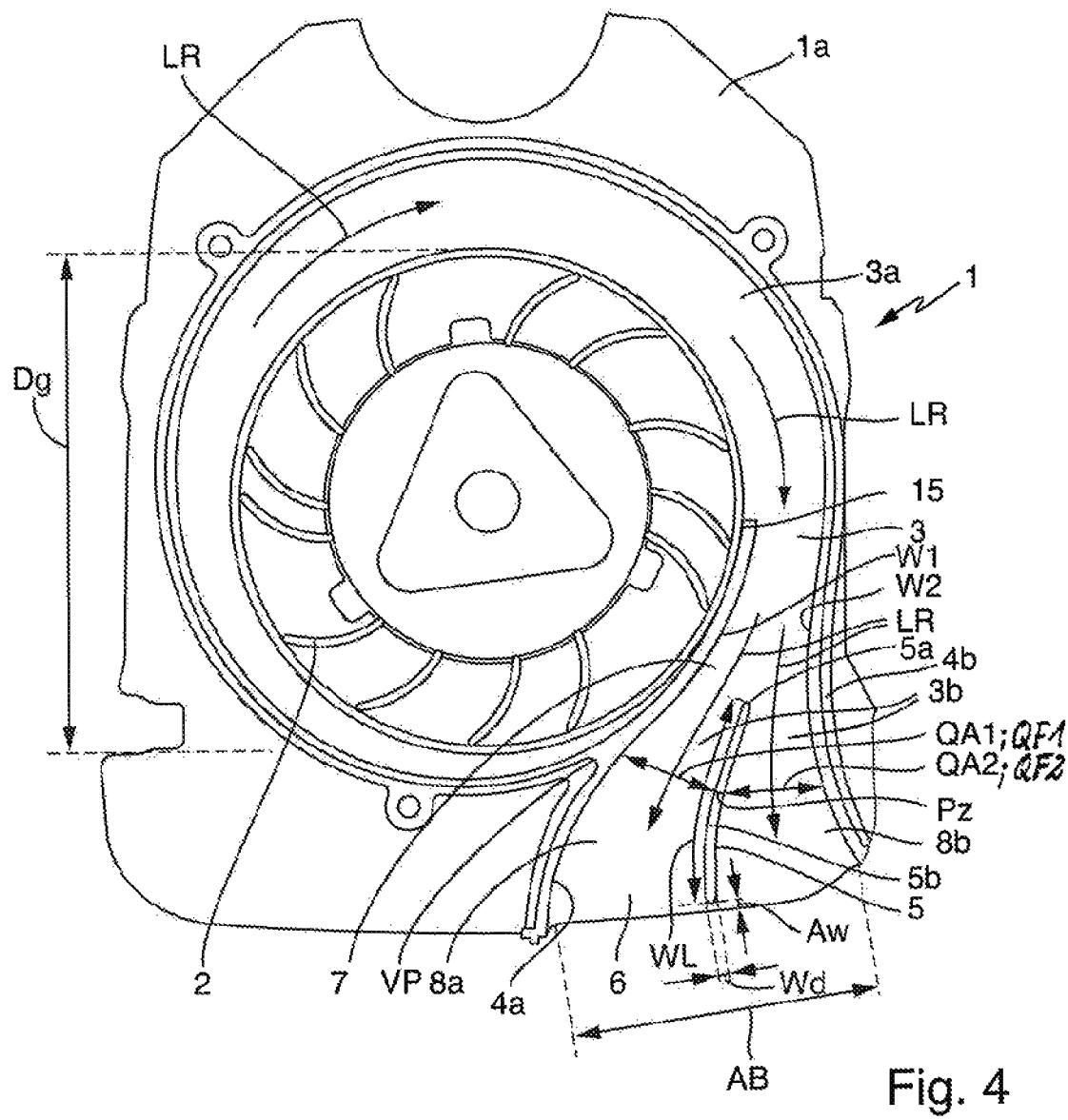
FIG. 4 shows a section through a radial fan, which can be used, for example, in a working apparatus of the kind shown in FIGS. 1 to 3, along a line IV-IV in FIG. 3.
Figure 5:
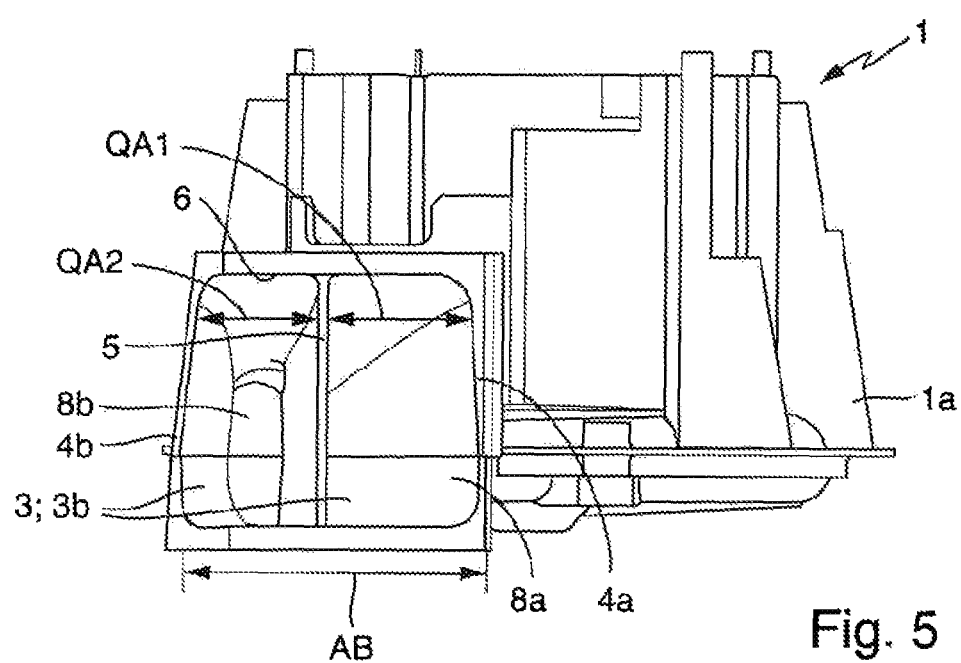
FIG. 5 shows a side view of the radial fan along a direction V in FIG. 3 from below.

The hand-guided working apparatus shown in illustrative implementations in FIGS. 1 to 3 can be, in particular, a hand-guided garden or forestry working apparatus and comprises a radial fan 1 which, as can be seen in more detail from FIGS. 4 and 5, has a fan impeller 2 and an air duct 3, which comprises a spiral portion 3a surrounding the fan impeller 2 and having a duct cross section $Q_k$, which increases in the air flow direction LR, and an outlet funnel portion 3b, which adjoins the spiral portion 3a, widens in a funnel shape in air flow direction LR and has a radially inner boundary wall 4a and a radially outer boundary wall 4b. The outlet funnel portion 3b ends in an air outlet opening 6, the outlet width AB of which is smaller than an outside diameter $D_g$ of the fan impeller 2. The radially inner boundary wall 4a and/or the radially outer boundary wall 4b of the outlet funnel portion 3b have/has a curvature opposed to that of the spiral portion 3a. In the implementation in FIGS. 4 and 5, both boundary walls 4a, 4b have a curvature opposed to that of the spiral portion 3a, or, to be more precise, the spiral portion has a clockwise curvature, and the two boundary walls 4a, 4b of the outlet funnel portion 3b have an anticlockwise curvature. The air duct 3 can be formed, in particular, by corresponding configuration of a fan housing 1a in the interior thereof, wherein the fan impeller 2 is inserted in a rotatable manner into the fan housing 1a, and the fan housing 1a can be constructed from two interconnected housing half shells, for example, as in the implementation shown.

Arranged in the outlet funnel portion 3b, between the radially inner boundary wall 4a and the radially outer boundary wall 4b is an intermediate wall 5, which extends with a curvature opposed to that of the spiral portion 3a, i.e. with an anticlockwise curvature in FIG. 4, and divides the outlet funnel portion 3b into two component portions 8a, 8b, each widening in the shape of a funnel in the air flow direction LR.

In corresponding implementations, as in the examples in FIGS. 1 to 3, the working apparatus comprises a working tool 11, an electric drive motor 9 for the working tool 11 and/or the radial fan 1, and a cooling air duct 10 for the drive motor 9, wherein the radial fan 1 is arranged in the cooling air duct 10. In alternative implementations, the working apparatus comprises an internal combustion engine as a drive motor instead of the electric drive motor 9.

In the implementation shown in FIGS. 1 to 3, the drive motor 9 is located in a motor housing 13, in which the cooling air duct 10 extends from an air inlet 12 into the housing 13 as far as an air outlet opening 6 from the radial fan 1 or from the motor housing 13. The drive motor 9 and optionally further apparatus components to be cooled are located in the cooling air duct 10, and the radial fan 1 ensures the required cooling air flow, wherein said fan is preferably driven by the drive motor 9 or, alternatively, is driven by some other drive. In the implementation shown, the working apparatus is of the so-called shaft type, in which the working tool 11 is connected to the motor housing 13 by an apparatus shaft 14, and a drive shaft leads from the drive motor 9 to the working tool 11 through the shaft 14. In alternative implementations, the working apparatus is of a non-shaft type, in which the working tool 11 is positioned in the motor housing 13 or directly adjoining the latter, for example.

In advantageous implementations, as in the exemplary implementation shown, an inner transverse spacing QA1 of the intermediate wall 5 from the radially inner boundary wall 4a and an outer transverse spacing QA2 of the intermediate wall 5 from the radially outer boundary wall 4b are equal or differ by at most 10%, in preferred implementations by at most 5%. It is self-evident here that the two transverse spacings QA1, QA2 are each based on an identical point on the intermediate wall 5 along the longitudinal extent of the latter, being indicated by way of example for a point Pz in FIG. 4, since both transverse spacings QA1, QA2 increase in the air flow direction owing to the funnel-shaped widening of the two component portions 8a, 8b. Alternatively or in addition, an inner cross-sectional area QF1 between the intermediate wall 5 and the radially inner boundary wall 4a and an outer cross-sectional area QF2 between the intermediate wall 5 and the radially outer boundary wall 4b are equal or differ by at most 10%, in particular by at most 5%, in this case too based on an identical point on the intermediate wall 5 along the longitudinal extent of the latter.

This means in each case that the outlet funnel portion 3b is divided by the intermediate wall 5 into the two component portions 8a, 8b, which are parallel in terms of flow and have a flow cross section which is substantially the same or at least does not greatly differ, wherein, along their length in the air flow direction LR, the two component portions 8a, 8b maintain this substantially equal or not greatly differing flow cross section relative to one another, while the flow cross section of each of the two component portions 8a, 8b per se increases continuously, preferably steadily, in the air flow direction LR owing to the funnel-shaped widening. For certain uses, provision can alternatively be made to arrange the intermediate wall 5 offset noticeably towards one of the two radial boundary walls 4a, 4b of the outlet funnel portion 3b.

In advantageous implementations, the wall thickness Wd of the intermediate wall 5 transversely to the air flow direction LR is constant, as in the exemplary implementation shown. Alternatively, the wall thickness Wd, although not constant, varies by at most 10%. For some uses, it may furthermore alternatively be desirable if the wall thickness varies to a large extent along the longitudinal extent of the intermediate wall 5, e.g. in a wedge shape with a maximum wall thickness at the base of the wedge, which is then typically several times larger than the minimum wall thickness at the tip of the wedge.

In advantageous implementations, the intermediate wall 5 ends flush with the air outlet opening 6 in the air flow direction LR or ends before the latter at a distance Aw which, although greater than zero, is at most 10% of the length WL of the intermediate wall 5 in the air flow direction LR and/or at most twice the wall thickness Wd of the intermediate wall 5, as in the exemplary implementation shown. In alternative implementations, the intermediate wall 5 ends at a relatively large distance Aw before the air outlet opening 6.

In an advantageous implementation, the wall thickness Wd of the intermediate wall 5 is at most 5% of the outlet width AB of the air outlet opening 4, as in the exemplary implementation shown. For some uses, it may alternatively be desirable to choose a wall thickness Wd of the intermediate wall 5 which is thicker in comparison therewith.

In advantageous implementations, an inflow-side wall side edge 5a of the intermediate wall 5 extends into a transitional region 7 of the spiral portion 3a and of the outlet funnel portion 3b. It has been found that this extent of the intermediate wall 5 extending a relatively long way in the direction of the spiral portion 3a into the air duct 3 is very advantageous for the desired noise minimization.

In corresponding implementations, the radially inner and/or the radially outer boundary wall 4a, 4b of the outlet funnel portion 3b continue/continues into the spiral portion 3a counter to the air flow direction LR and change/changes their/its direction of curvature in the transitional region 7. In the example shown, the radially inner boundary wall 4a extends as far as an inflow-side end edge 15 into the spiral portion 3a, and changes its direction of curvature at an associated inflection point W1 in the transitional region 7. The radially outer boundary wall 4b continues into the overall spiral portion 3a, around the fan impeller 2, and merges with the radially inner boundary wall 4a at a merging point VP. Moreover, the outer boundary wall 4b changes its direction of curvature at an inflection point W2 in the transitional region 7. For some uses, an alternative implementation, in which the radial boundary walls 4a, 4b do not change their direction of curvature in the transitional region 7 or do not continue into the spiral portion 3a, in particular the radially inner boundary wall 4a, may be desirable.

In corresponding implementations, as in the exemplary implementation shown, the intermediate wall 5 is of continuous, perforation-free design, i.e. the intermediate wall 5 does not have any openings between the two component portions 8a, 8b into which it divides the outlet funnel portion 3b. For some uses, an alternative configuration, in which the intermediate wall 5 is formed as a perforated wall having one or more perforation openings, may be desired.

In advantageous implementations, as in the example shown, the intermediate wall 5 has a sound-damping surface 5b and/or is formed from a sound-absorbing material. Suitable surface coatings or surface profiling and suitable wall materials for the provision of this sound-damping characteristic are known per se for such uses, and this therefore does not require any further explanation here. In alternative implementations, the intermediate wall 5 can be formed without a sound-damping surface from a material which does not absorb sound.

As the exemplary implementations which are shown and the additional exemplary implementations explained above make clear, the invention makes available a hand-guided working apparatus which is optimized in a very advantageous way in respect of low noise emissions of its radial fan. In particular, the working apparatus can be a hand-guided garden or forestry working apparatus of any desired conventional type as long as a radial fan is used in said apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided working apparatus, comprising:
   a radial fan which has a fan impeller and an air duct, said air duct comprising a spiral portion surrounding the fan impeller and having a duct cross section which increases in air flow direction and an outlet funnel portion which adjoins the spiral portion, widens in a funnel shape in the air flow direction, and has a radially inner boundary wall and a radially outer boundary wall, wherein the outlet funnel portion ends in an air outlet opening, an outlet width of the air outlet opening being smaller than an outside diameter of the fan impeller,
   wherein at least one of the radially inner and the radially outer boundary wall of the outlet funnel portion has a curvature opposed to that of the spiral portion,
   wherein an intermediate wall is arranged in the outlet funnel portion, between the radially inner and the radially outer boundary wall, the intermediate wall extending with a curvature opposed to that of the spiral portion and dividing the outlet funnel portion into two component portions, each widening in the shape of a funnel in the air flow direction, and
   wherein the radially inner boundary wall extends into the spiral portion, in an airflow upstream direction, up to an inflow-side end edge that is beyond an inflow-side wall side edge of the intermediate wall.

2. The hand-guided working apparatus according to claim 1, wherein
   an inner transverse spacing of the intermediate wall from the radially inner boundary wall and an outer transverse spacing of the intermediate wall from the radially outer boundary wall are equal or differ by at most 10%.

3. The hand-guided working apparatus according to claim 1, wherein
   an inner cross-sectional area between the intermediate wall and the radially inner boundary wall and an outer cross-sectional area between the intermediate wall and the radially outer boundary wall are equal or differ by at most 10%.

4. The hand-guided working apparatus according to claim 1, wherein
   a wall thickness of the intermediate wall transversely to the air flow direction is constant, or
   a maximum wall thickness of the intermediate wall is at most 10% greater than a minimum wall thickness.

5. The hand-guided working apparatus according to claim 1, wherein
   the intermediate wall ends flush with the air outlet opening in the air flow direction, or
   the intermediate wall ends before the air outlet opening at a distance which is at least one of: at most 10% of a length of said intermediate wall in the air flow direction and at most twice a wall thickness of said intermediate wall.

6. The hand-guided working apparatus according to claim 1, wherein
   a wall thickness of the intermediate wall is at most 5% of the outlet width of the air outlet opening.

7. The hand-guided working apparatus according to claim 1, wherein
   the inflow-side wall side edge of the intermediate wall extends into a transitional region of the spiral portion and of the outlet funnel portion.

8. The hand-guided working apparatus according to claim 1, wherein
   at least one of the radially inner boundary wall and the radially outer boundary wall of the outlet funnel portion continues counter to the air flow direction into the spiral portion and changes its direction of curvature in a transitional region of the spiral portion and of the outlet funnel portion.

9. The hand-guided working apparatus according to claim 1, wherein
   the intermediate wall has a continuous, perforation-free form.

10. The hand-guided working apparatus according to claim 1, wherein
    at least one of the intermediate wall, the radially inner boundary wall and the radially outer boundary wall has a sound-damping surface or is formed from a sound-absorbing material.

11. The hand-guided working apparatus according to claim 1, further comprising:
    a working tool, an electric drive motor for the working tool, and a cooling air duct for the drive motor, wherein the radial fan is arranged in the cooling air duct.

12. The hand-guided working apparatus according to claim 1, wherein the apparatus is a hand-guided garden or forestry working apparatus.

13. A hand-guided working apparatus, comprising:
    a radial fan which has a fan impeller and an air duct, said air duct comprising a spiral portion surrounding the fan impeller and having a duct cross section which increases in air flow direction and an outlet funnel portion which adjoins the spiral portion, widens in a funnel shape in the air flow direction, and has a radially inner boundary wall and a radially outer boundary wall, wherein the outlet funnel portion ends in an air outlet opening, an outlet width of the air outlet opening being smaller than an outside diameter of the fan impeller, wherein at least one of the radially inner and the radially outer boundary wall of the outlet funnel portion has a curvature opposed to that of the spiral portion, wherein an intermediate wall is arranged in the outlet funnel portion, between the radially inner and the radially outer boundary wall, the intermediate wall extending with a curvature opposed to that of the spiral portion and dividing the outlet funnel portion into two component portions, each widening in the shape of a funnel in the air flow direction, and wherein the intermediate wall, at an inflow-side wall side edge of the intermediate wall, divides a cross section of the air duct into a radially inner cross-sectional area and a radially outer cross-sectional area that are equal or differ by at most 10%.

14. The hand-guided working apparatus according to claim 13, wherein
a wall thickness of the intermediate wall transversely to the air flow direction is constant, or
a maximum wall thickness of the intermediate wall is at most 10% greater than a minimum wall thickness.

15. The hand-guided working apparatus according to claim 13, wherein
the intermediate wall ends flush with the air outlet opening in the air flow direction, or
the intermediate wall ends before the air outlet opening at a distance which is at least one of: at most 10% of a length of said intermediate wall in the air flow direction and at most twice a wall thickness of said intermediate wall.

16. The hand-guided working apparatus according to claim 13, wherein
the inflow-side wall side edge of the intermediate wall extends into a transitional region of the spiral portion and of the outlet funnel portion.

17. The hand-guided working apparatus according to claim 13, wherein
at least one of the radially inner boundary wall and the radially outer boundary wall of the outlet funnel portion continues counter to the air flow direction into the spiral portion and changes its direction of curvature in a transitional region of the spiral portion and of the outlet funnel portion.

18. The hand-guided working apparatus according to claim 13, wherein
the intermediate wall has a continuous, perforation-free form.

19. The hand-guided working apparatus according to claim 13, wherein
at least one of the intermediate wall, the radially inner boundary wall and the radially outer boundary wall has a sound-damping surface or is formed from a sound-absorbing material.

20. The hand-guided working apparatus according to claim 13, further comprising:
a working tool, an electric drive motor for the working tool, and a cooling air duct for the drive motor, wherein the radial fan is arranged in the cooling air duct.

* * * * *